US011866883B2

(12) United States Patent
Lindblom

(10) Patent No.: US 11,866,883 B2
(45) Date of Patent: Jan. 9, 2024

(54) REFINER SEGMENT WITH VARYING DEPTH PROFILE

(71) Applicant: VALMET AB, Sundsvall (SE)

(72) Inventor: Thommy Lindblom, Hägersten (SE)

(73) Assignee: VALMET AB, Sundsvall (SE)

( * ) Notice: Subject to any disclaimer, the term of this patent is extended or adjusted under 35 U.S.C. 154(b) by 431 days.

(21) Appl. No.: 17/261,627

(22) PCT Filed: Jun. 3, 2019

(86) PCT No.: PCT/SE2019/050508
§ 371 (c)(1),
(2) Date: Jan. 20, 2021

(87) PCT Pub. No.: WO2020/022941
PCT Pub. Date: Jan. 30, 2020

(65) Prior Publication Data

US 2021/0262167 A1 Aug. 26, 2021

(30) Foreign Application Priority Data

Jul. 25, 2018 (SE) .................................... 1850942-2

(51) Int. Cl.
*D21D 1/30* (2006.01)
*B02C 7/12* (2006.01)

(52) U.S. Cl.
CPC ............... *D21D 1/306* (2013.01); *B02C 7/12* (2013.01); *D21D 1/303* (2013.01); *D21D 1/30* (2013.01)

(58) Field of Classification Search
CPC .......... D21D 1/306; D21D 1/303; D21D 1/30; D21D 1/006; D21D 1/008; B02C 7/12
See application file for complete search history.

(56) References Cited

U.S. PATENT DOCUMENTS 1,609,717 A * 12/1926 Holland-Letz ............ B02C 7/12 241/261.3
1,609,718 A * 12/1926 Holland-Letz ......... D21D 1/306 241/261.3

(Continued)

FOREIGN PATENT DOCUMENTS

EP 2077352 A1 7/2009
EP 2669427 A2 12/2013

(Continued)

OTHER PUBLICATIONS

Japanese Office Action issued in connection with JP Appl. Ser. No. 2021-503759 dated Mar. 14, 2023.

*Primary Examiner* — Faye Francis
(74) *Attorney, Agent, or Firm* — Foley & Lardner LLP

(57) ABSTRACT

A refiner segment configured to be attached to a refiner disc in a refiner of lignocellulosic material includes: a plurality of bars extending in a direction from an inner periphery of the refiner segment towards an outer periphery of the refiner segment; a plurality of intermediate areas, each intermediate area disposed between adjacent bars of the plurality of bars and configured to separate each bar from an adjacent bar, wherein at least one of the intermediate areas includes: a channel region having a first side and extending a first depth into the refiner segment, and a ridge region connected to the first side of the channel region and extending a second depth into the refiner segment less than the first depth. The channel region has a width $W_1$ that gradually decreases in a direction from the outer periphery of the refiner segment toward the inner periphery of the refiner segment, and the ridge region has a width $W_2$ that correspondingly increases in the direction from the outer periphery of the refiner segment toward the inner periphery of the refiner segment.

16 Claims, 7 Drawing Sheets

(56) References Cited

U.S. PATENT DOCUMENTS

| | | | | | |
|---|---|---|---|---|---|
| 3,910,511 | A * | 10/1975 | Leider | D21D 1/306 241/261.3 |
| 5,046,672 | A | 9/1991 | Demler | |
| 5,467,931 | A | 11/1995 | Dodd | |
| 5,476,228 | A * | 12/1995 | Underberg | D21D 1/306 241/296 |
| 5,893,525 | A | 4/1999 | Gingras | |
| 6,325,308 | B1 * | 12/2001 | Lofgren | B02C 7/12 241/261.3 |
| 6,592,062 | B1 * | 7/2003 | Virving | B02C 7/12 241/261.3 |
| 6,607,153 | B1 * | 8/2003 | Gingras | B02C 7/12 241/261.3 |
| 2003/0183712 | A1 * | 10/2003 | Virving | D21D 1/30 241/296 |
| 2006/0151649 | A1 * | 7/2006 | Virving | D21D 1/30 241/298 |
| 2007/0210197 | A1 | 9/2007 | Carpenter | |
| 2008/0210795 | A1 * | 9/2008 | Antensteiner | D21D 1/306 241/261.3 |
| 2012/0032011 | A1 * | 2/2012 | Ruola | D21D 1/306 241/291 |

FOREIGN PATENT DOCUMENTS

| | | | |
|---|---|---|---|
| JP | 2009-174108 | A | 8/2009 |
| WO | WO 95/24528 | A1 | 9/1995 |

* cited by examiner

REFINER SEGMENT WITH VARYING DEPTH PROFILE

TECHNICAL FIELD

The proposed technology generally relates to refiner segments for a refiner of lignocellulosic material. More specifically it relates to refiner segments having a varying cross-sectional depth profile. The proposed technology also relates to refiner discs provided with such refiner segments as well as refiners provided with refiner discs equipped with the proposed refiner segments.

BACKGROUND

A typical refiner of e.g., lignocellulosic material comprises two relatively rotating discs between which the material is refined or defibrated. The pair of relatively rotating discs may in particular comprise one rotating disc, referred to as a rotor, and a static disc, referred to as a stator. These discs, or at least one of them, are often provided with segments, referred to as refiner segments, in order to obtain a more efficient refining of the material. At least one of the cooperating stator and rotor discs are often equipped with refiner segments provided with bars and dams. The bars are protruding structures arranged on the segment that are mainly utilized to provide an efficient refining of the lignocellulosic material. The purpose of the dams are instead primarily to guide, or lift, the material flow towards the disc gap between two refining discs, e.g., the disc gap between a rotor and a stator or the disc gap that separates the two relatively rotating discs. It is in the disc gap between the discs that the material is refined or defibrated. During normal use of a refiner the refining or defibration action will cause friction which in turn will heat up the processed material. Since lignocellulosic material, e.g., wood pulp, naturally contains water the friction will heat up the water and steam will be created. The created steam may severely affect the material flow. It may interact with material flow and perturb the intended paths for the material flow.

A particular purpose of the proposed technology is to provide mechanisms that at least alleviates some of the problems that are associated with the interaction between the steam and the material flow.

SUMMARY

It is a general object to provide refiner segments that enable an improved material flow.

It is a particular object to provide refiner segments that enables a separation of the material flow on the refiner segment and the steam flow on the same.

It is an additional object to provide a refiner disc provided with refining segments that enables an improved material flow and in particular enables a separation of the material flow on the refiner segment and the steam flow on the same.

It is yet another object to provide a refiner that is equipped with at least one refining disc that enables an improved material flow and in particular enables a separation of the material flow on the refiner segment and the steam flow on the same.

According to a first aspect, there is provided a refiner segment adapted to be attached to a refiner disc in a refiner of lignocellulosic material, the refiner segment being provided with a plurality of spaced apart bars extending in a direction from an inner periphery of the refiner segment towards an outer periphery of the refiner segment, where each pair of adjacent bars bounds a corresponding intermediate area on the refiner segment. The refiner segment comprises at least one intermediate area that comprises a channel region and a ridge region. The channel region connecting at a first side to the ridge region 24 and extending deeper into the refiner segment 10 than the ridge region 24 in order to create an intermediate area 22 having a cross-section with a varying depth profile.

According to a second aspect there is provided a refiner disc provided with a refiner segment according to the first aspect According to a third aspect there is provided a refiner disc according to the second aspect, wherein the refiner disc is a stator disc or a rotor disc.

According to a fourth aspect there is provided a refiner comprising a refiner disc according to the second or third aspect.

Embodiments of the proposed technology yields a better controlled material flow on the refining segments. This will in turn ensure a more even refining action and a better end product.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, etc. are to be interpreted openly as referring to at least one instance of the element, apparatus, component, means, etc., unless explicitly stated otherwise. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

For a better understanding of the proposed technology, it may be useful to begin with a brief overview of the relevant technology and an analysis of the associated technical problem.

Figure 1:
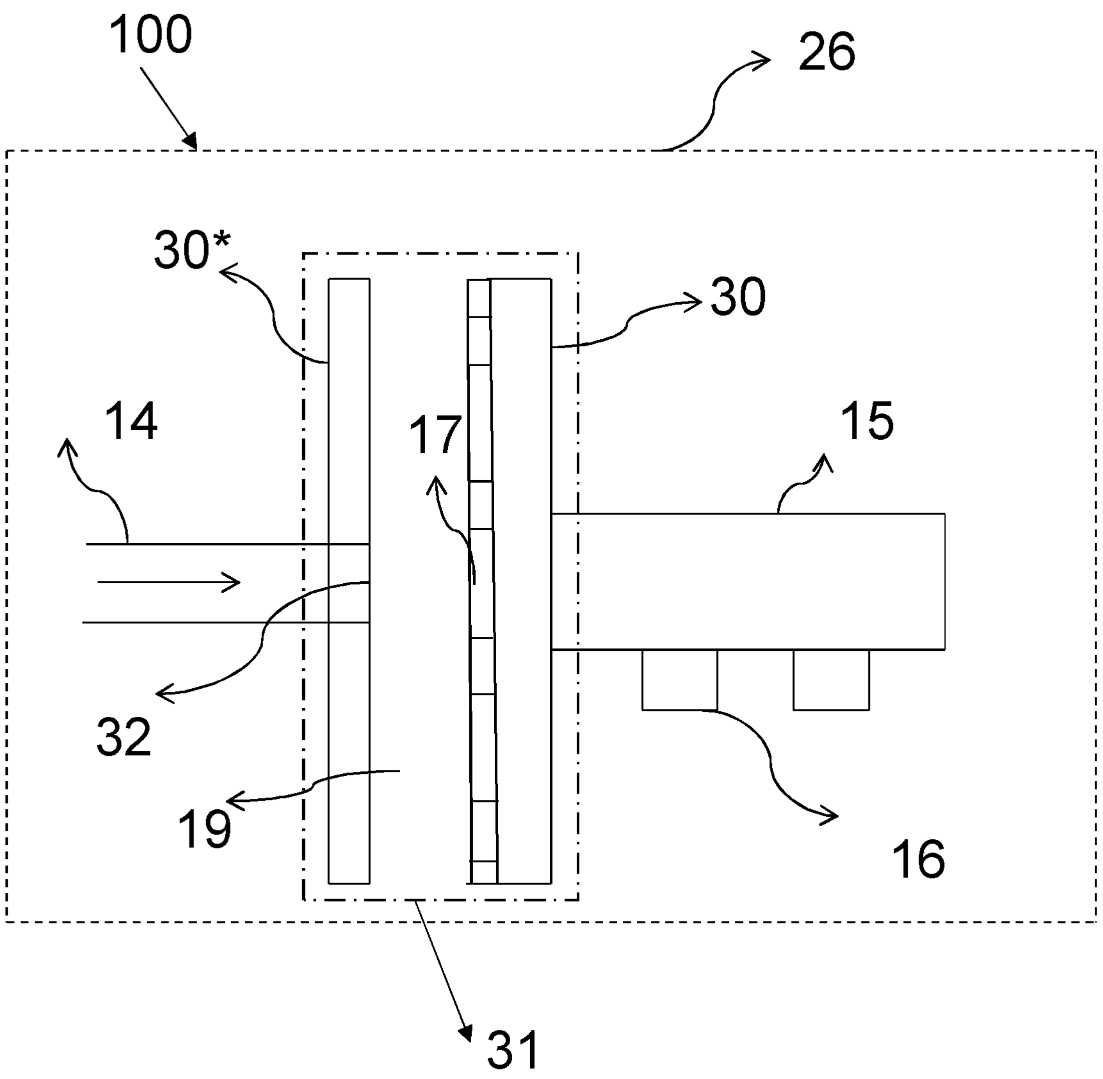
FIG. 1 is a schematic illustration of a conventional refiner which may utilize the proposed technology.

To this end reference is made to FIG. 1 which schematically illustrates a refiner that can utilize the proposed technology. FIG. 1 schematically shows an exemplary pulp refiner in a cross-sectional view. The arrangement is housed in a housing 26 that represents the outer casing of the refiner device together with all components of the device that is not essential for understanding the present invention. Examples of components not shown are an electrical motor for driving e.g. the rotation shaft, the feeding mechanism for the lignocellulosic material etc. Inside a second housing 31 a rotor refiner disc 30 and a stator refiner disc 30* is linearly aligned along a shaft. The rotor refiner disc 30 and the stator refiner disc 30* will in what follows be referred to as a rotor and stator, respectively. The rotor 30 is attached to a rotation shaft 15 arranged on bearings 16. The rotation shaft 15 is connected to a motor, not shown, that rotates the shaft 15, and thus the rotor 30. The stator 30* facing the rotor 30 can be provided with a centrally located through hole 32 that extends between a feeding channel 14 for lignocellulosic material and a refining area 19. The rotor 30 can in certain embodiments be provided with a center plate 17 having a surface facing the incoming flow of lignocellulosic material. The surface of the center plate 17 can be provided with structures that will direct the lignocellulosic material outwards. The rotor 30* and/or the stator 30 are provided with refiner segments to enable steering and grinding of the pulp. These refiner segments can be provided with bars and dams.

During use, lignocellulosic material such as wood chips or prepared wood, e.g., pulp, will be fed by means of a feeding mechanism, not shown, through the feeding channel 14. The material will pass through the hole 32 in the stator 30* and enter an area 19. The area 19 is essentially defined by the open area between the rotor 30 and the stator 30* and this area can be quite small during operation. The lignocellulosic material flowing into the area 19 will be incident on the center plate 17 on the rotor 30. The center plate 17 acts to steer the lignocellulosic material out towards the refiner segments on the rotor and/stator.

Figure 2:
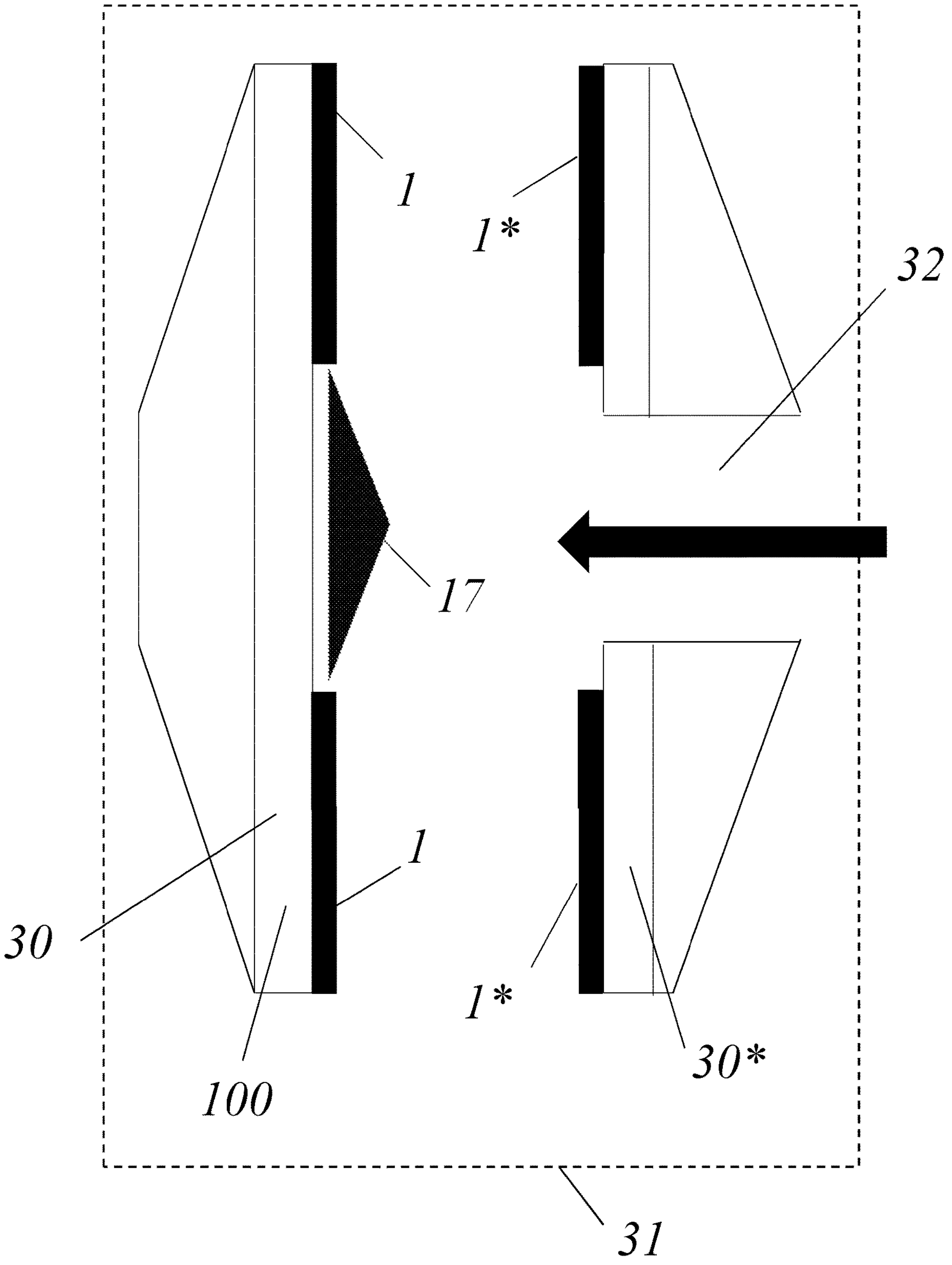
FIG. 2 is a schematic illustration of the oppositely arranged refiner discs of the refiner illustrated in FIG. 1.

In order to provide a more detailed description of a rotor-stator arrangement in which the proposed technology may be used reference is made to FIG. 2. FIG. 2 illustrates a cross-sectional side view of a rotor stator arrangement housed in a housing 31 in a refiner as e.g., described above. Shown is a rotor that is arranged to rotate around a rotation shaft. The rotor is provided, on the surface facing the stator, with a refining disc 30 comprising a refiner segment 1. The stator is provided, on the surface facing the rotor, with a refining disc 30* comprising a refiner segment 1*. The refining discs may in certain versions of a refiner be referred to as a segment holders since one of the purposes of the refining discs are to carry refiner segments 1, 1*. Also illustrated in FIG. 2 is an inlet 32 for the lignocellulosic material subject to refining. The inlet 32 is arranged in the central area of the stator. Arranged in the center area of the refining disc on the rotor side, opposing the inlet 32, is a center plate 17. The purpose of the center plate 17, which was described above with reference to FIG. 1, is to distribute material that falls in from the inlet 32 towards the outer sections of the refining disc. That is, the center plate 17 acts to distribute the material towards the refiner segments arranged on the refiner discs.

Figure 3A:
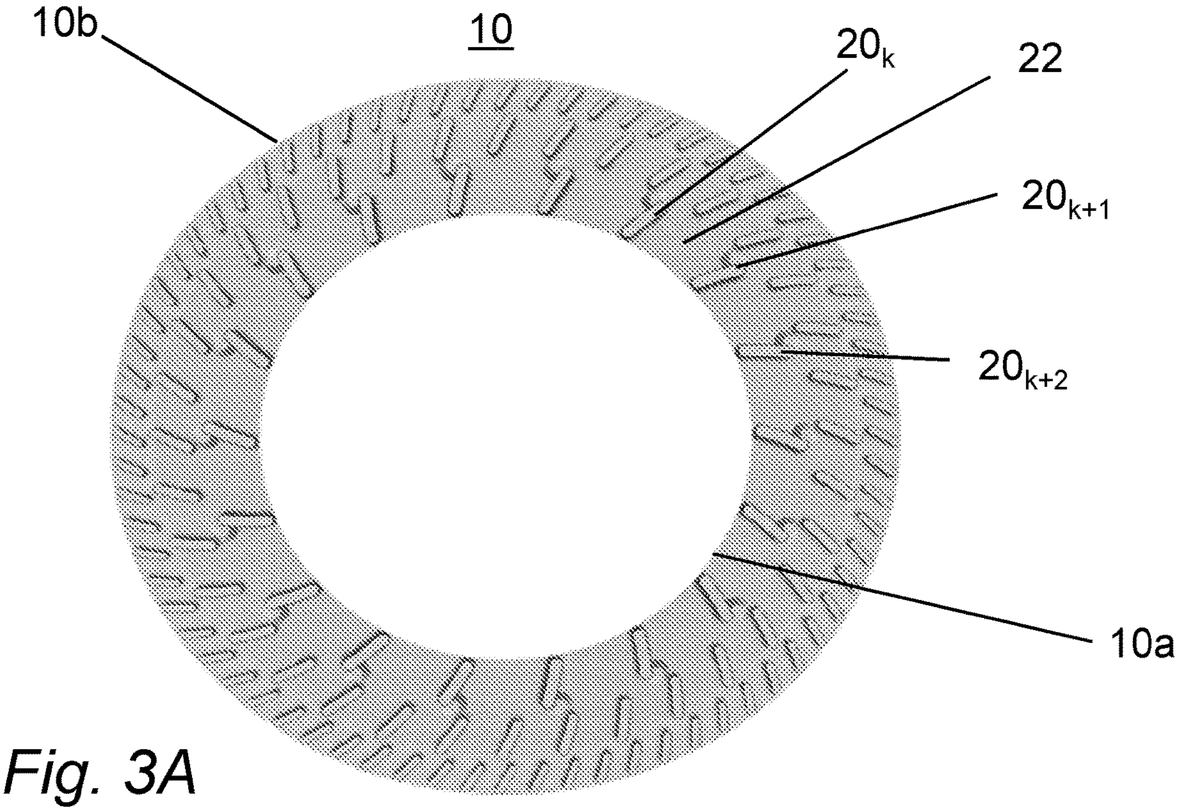
FIG. 3A is a schematic illustration of a circularly shaped refiner segment.
Figure 3B:
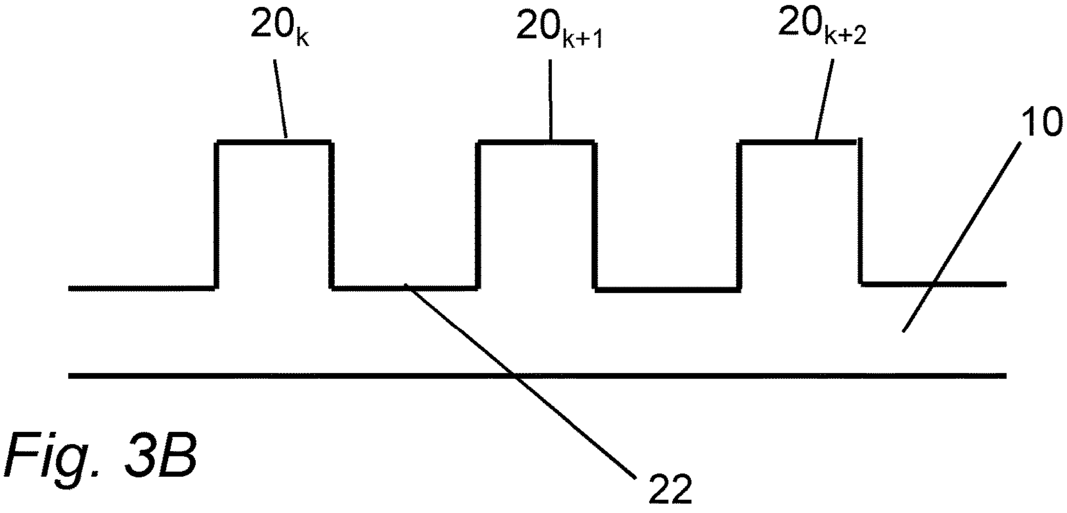
FIG. 3B is a schematic illustration of the cross-section of a section of the circularly shaped refiner segment in FIG. 3A.

Having described in detail a general refiner that can utilize the proposed technology, we will proceed and describe in detail a particular refiner segment that is relevant for the proposed technology. To this end reference is made to FIG. 3A. FIG. 3A illustrates a possible circular refiner segment that are to be attached to a refiner disc in a refiner. Other versions are possible, such as a refiner segment wherein the bars extend all the way from the outer periphery of the segment to the inner periphery of the same. The bars may have a straight shape but they could also be curved. The proposed technology may be used in all these versions. The circular refiner segment 10 in FIG. 3A extends between an inner periphery 10*b* and an outer periphery 10*a* and is provided with a plurality of radially extending bars. Three of the bars are designated with the reference numeral $\mathbf{20}_k$, $\mathbf{20}_{k+1}$, $\mathbf{20}_{k+2}$, respectively, where the index k denotes a specific bar and runs from 1 to N, where N is the total number of bars on the refiner segment. A pair of adjacent bars $\mathbf{20}_k$, $\mathbf{20}_{k+1}$, bounds an intermediate area 22. The material flow on the refiner segment is mainly concentrated to such intermediate areas. FIG. 3B provides an alternative view of part of the refiner segment 10 in FIG. 3A. A section of the refiner segment that comprises the bars $\mathbf{20}_k$, $\mathbf{20}_{k+1}$, $\mathbf{20}_{k+2}$ is illustrated in cross-section. The area 22 that lies between, or is partially bounded by, adjacent bars $\mathbf{20}_k$, $\mathbf{20}_{k+1}$ is a planar area. One particular problem with a refiner segment as illustrated in FIGS. 3A and 3B is that the steam produced during use of the refiner segment will be forced to move in the area 22 and the steam will therefore interact and interfere with the material flow in the same area thereby rendering a less than optimal material flow. The proposed technology aims to counter at least part of this problem by providing mechanisms that enables a separation of the material flow and the steam flow. This is obtained by providing the intermediate area 22 of the refining segment with a varying depth profile. The depth profile comprises in particular a channel region that extends deeper into the bulk of the refiner segment than a neighboring ridge region. The channel region will provide the steam with an alternative path over the refiner segment while the adjacent ridge region will enable the material flow to traverse adjacent bars in surfing-like manner, i.e., without entering the channel region. With ridge region is here intended a region in the intermediate area that is raised relative the channel region. That is to say, the ridge region is arranged higher than the channel region with regard to the working surface of the refiner segment. The ridge region may raise abruptly from the adjacent channel region, as shown in e.g., FIGS. 3B and 4A, thereby forming a plateau, or it can gradually rise from a lowest point where the ridge region connects to the channel region to a highest point where it connects to a bar.

Figure 4A:
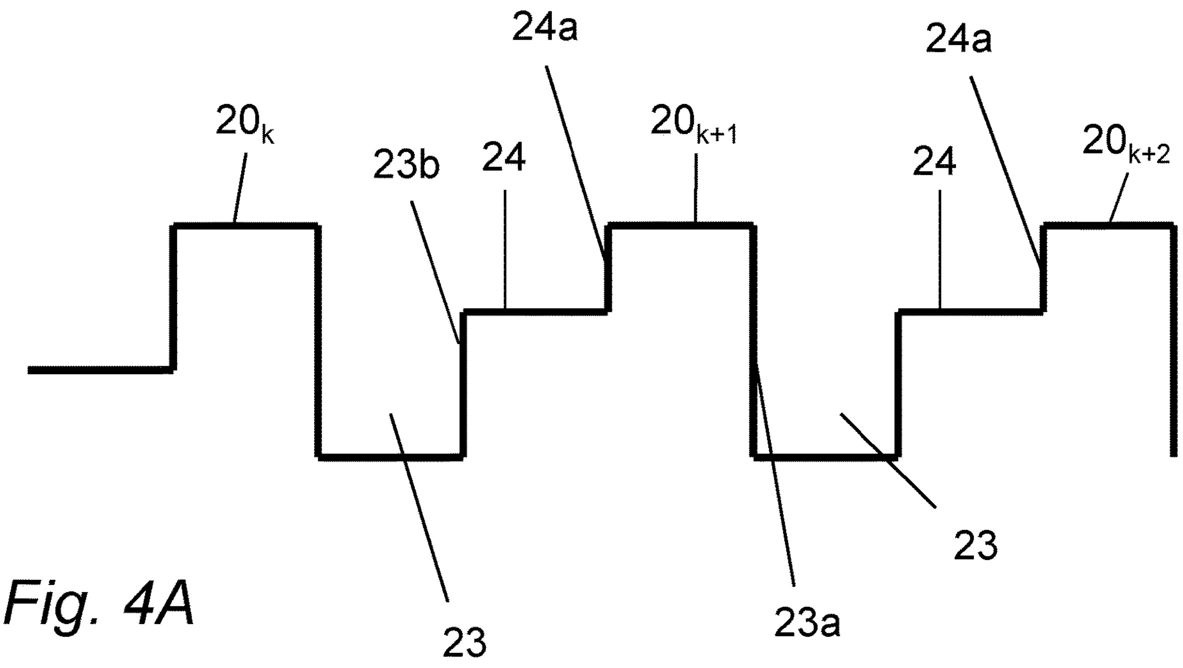
FIG. 4A is a schematic illustration of a refiner segment according to the proposed technology.
Figure 4B:
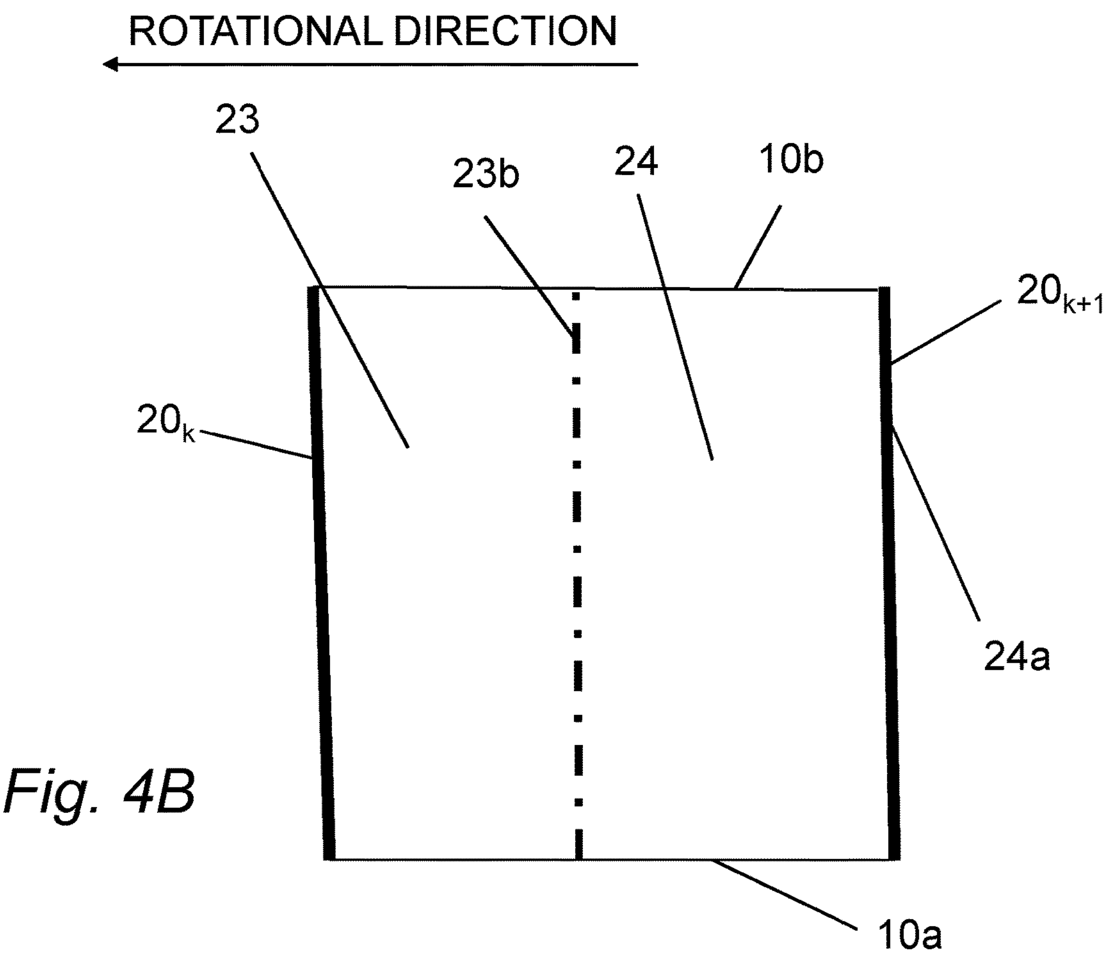
FIG. 4B is a schematic illustration of the cross-section of a part of the refiner segment shown in FIG. 4A.

FIG. 4B provides a schematic illustration of a refiner segment 10 according to the proposed technology as viewed from above, i.e., in a top view. Shown is a refiner segment 10 that is adapted to be attached to a refiner disc 30 in a refiner 100 of lignocellulosic material. The refiner segment 10 is provided with a plurality of spaced apart bars 20; extending in a direction from an inner periphery 10*a* of the refiner segment 10 towards an outer periphery 10*b* of the refiner segment 10, where each pair of adjacent bars $\mathbf{20}_k$; $\mathbf{20}_{k+1}$ bounds a corresponding intermediate area 22 on the refiner segment 10. The refiner segment 10 comprises at least one such intermediate area 22 that comprises a channel region 23 and a ridge region 24 in the form of a plateau region 24. The channel region 23 connecting at a first side 23*b* to the plateau region 24 and extending deeper into the refiner segment 10 than the plateau region 24 in order to create an intermediate area 22 having a cross-section with a varying depth profile.

FIG. 4A provides a schematic illustration of a cross-section of the refiner segment illustrated in FIG. 4B. The cross-sectional view illustrates how the intermediate area between two adjacent bars is divided into two adjacent region, a channel region 23 and a ridge region in the form of a plateau region 24. The different regions are joined at one end, or side, 23*b* of the channel region. At the side 23*b* the channel region 23 raises steeply and goes over into the plateau region 24. The plateau region 24 connects to the bar $\mathbf{20}_{k+1}$ at a side 24*a*. The varying depth profile of the intermediate area, as viewed in a cross-sectional view will enable steam produced during the refining process to travel along the channel region 23 while the any material flow will traverse the intermediate area mainly over the plateau region, i.e., the material flow traverses the intermediate area 22 in a surfing-like manner.

According to a particular embodiment of the proposed technology there is provided a refiner segment 20 wherein a second side 23*a* of the channel region 23 connects to a first bar $\mathbf{20}_k$ in the pair of adjacent bars $\mathbf{20}_k$; $\mathbf{20}_{k+1}$ and wherein one side 24*a* of the ridge region 24 connects to a second bar $\mathbf{20}_{k+1}$ in the pair of adjacent bars $\mathbf{20}_k$; $\mathbf{20}_{k+1}$. This particular embodiment where the channel region connects to the first bar $\mathbf{20}_k$ ensures a maximal depth difference between adjacent areas on the refining segment. This will in turn increase the possibility that the material flow traverses over the intermediate area 22 without entering the channel region 23.

The channel region 23 may have a number of different shapes that will facilitate the separation of the steam flow and the material flow in the intermediate area. The channel region 23 may for example comprise a channel having a block shaped cross-section, or a channel having an at least partially angled cross-section, or a channel having a more chamfered cross-section. The channel region may also be a channel having a bowl-shaped cross-section.

Figure 5A:
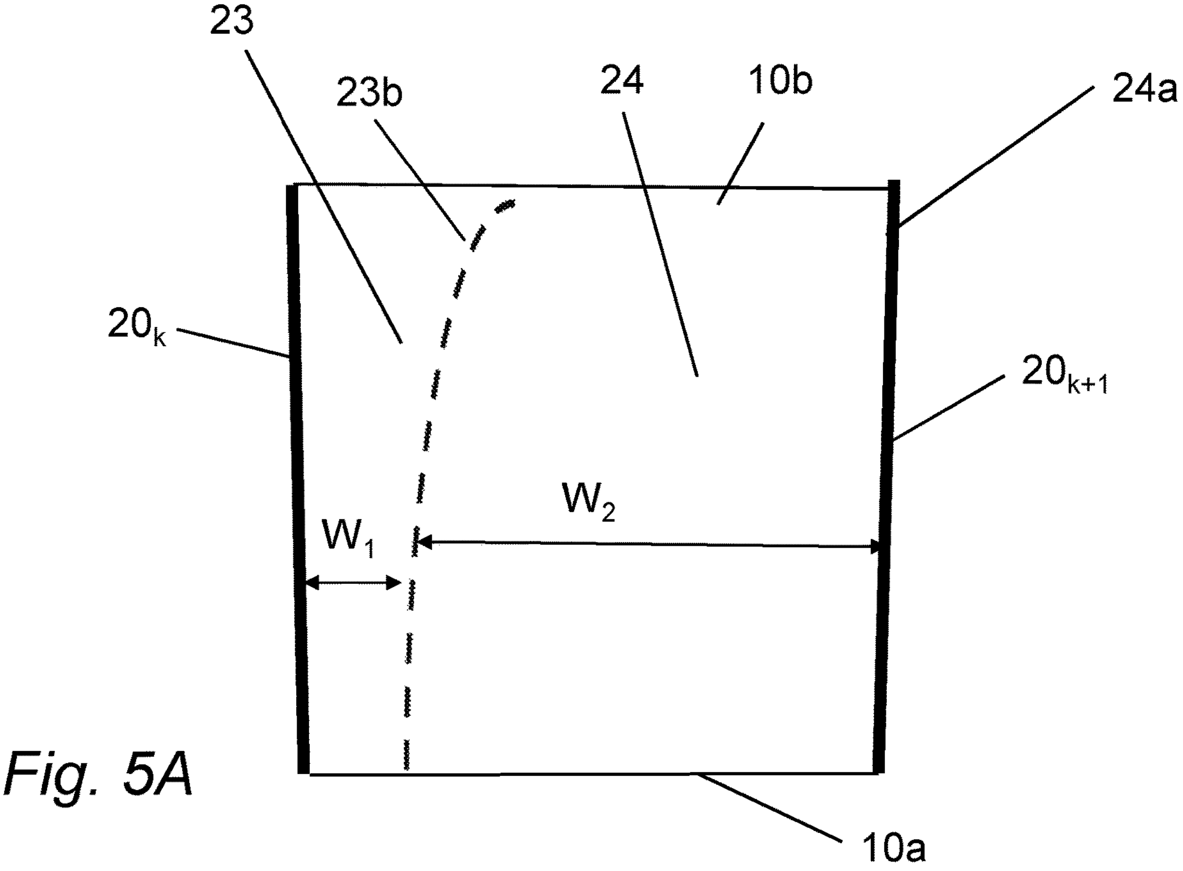
FIG. 5A is a schematic illustration of an embodiment of the refiner segment according to the proposed technology.

According to another possible embodiment of the proposed technology there is provided a refiner segment 10, wherein the channel region 23 have a depth that is getting increasingly deeper in a direction from the outer periphery 10*b* of the refiner segment 10 to the inner periphery 10*a* of the refiner segment 10. This embodiment ensures that the volume of the channel region 23 is able to transport a larger amount of steam, and enables a laminate material- and steam flow, in the vicinity of the inner periphery 10*a* of the refiner segment the embodiment also enables a laminate material and steam flow According to an additional embodiment of the proposed technology that also enables the channel region 23 to transport a larger amount of steam in the vicinity of the inner periphery 10*a* and further enables a laminate material- and steam flow provides a refiner segment 10 where the channel region 23 have a width $W_1$ that is gradually getting smaller in the direction from the outer periphery 10*b* of the refiner segment 10 to the inner periphery 10*a* of the refiner segment 10, and wherein the ridge region 24, e.g., the plateau region 24, have a width $W_2$, that is getting correspondingly larger in the direction from the outer periphery 10*b* of the refiner segment 10 to the inner periphery 10*a* of the refiner segment 10. This embodiment is schematically illustrated in FIG. 5A.

Figure 5B:
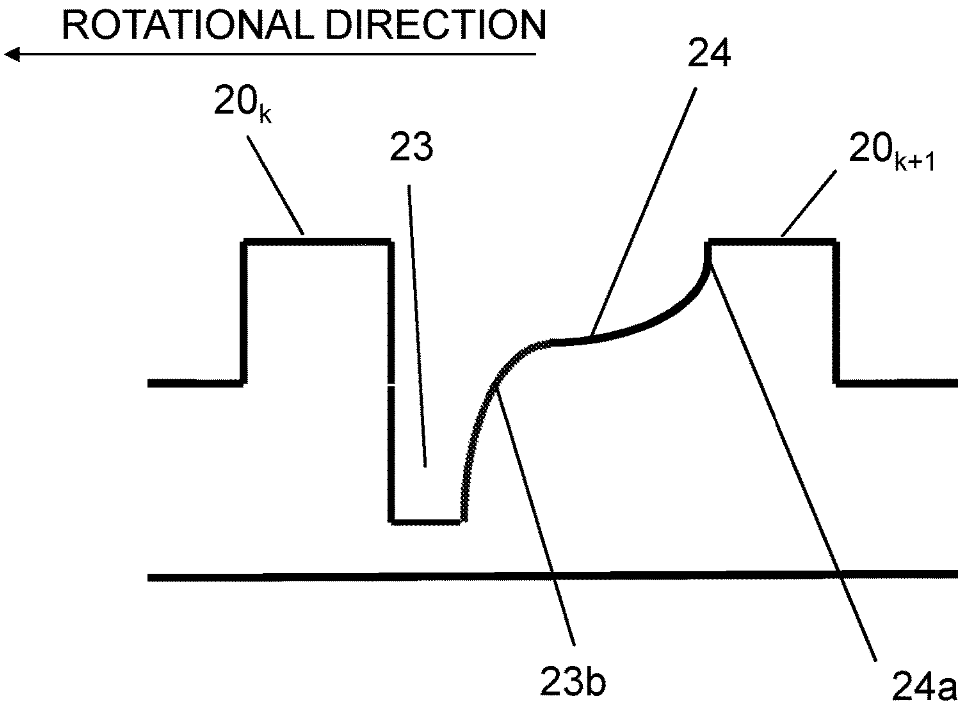
FIG. 5B is a schematic illustration of the cross-section of a part of the refiner segment shown in FIG. 5A.

Still another embodiment of the proposed technology provides a refiner segment 10 wherein the ridge region or, in certain embodiments, the plateau region 24 has an height that is getting increasingly larger in a direction extending from the side where the ridge region or plateau region connects to the channel region 23 to the side where the ridge region 24 connects to the second bar $\mathbf{20}_{k+1}$ in the pair of adjacent bars $\mathbf{20}_k$; $\mathbf{20}_{k+1}$ in order to create an intermediate area 22 having a depth profile where the depth is gradually getting smaller in the direction extending from the first bar $\mathbf{20}_k$ to the second bar $\mathbf{20}_{k+1}$. This embodiment is schematically illustrated in FIG. 5B which illustrates how the ridge region 24 gradually and smoothly raises from a particular height at the location of side 23*b* to a larger height at an opposite side 24*a* and how the plateau region merges with the bar $\mathbf{20}_{k+1}$. This embodiment ensures that the material flow that traverses the area 22 do so in a smooth fashion without encountering any substantially sharp corners. This provides a better controlled material flow since the lack of sharp edges suppresses the emergence of turbulence and other flow disturbances.

According to still another embodiment of the proposed technology provides a refiner segment 10 wherein the relative height difference between the deepest part of the channel region 23 and the ridge region 24 or plateau region 24 is gradually getting larger in a direction extending from the outer periphery 10*a* toward the inner periphery 10*b*. This embodiment also ensures an increase in the volume of the channel region 23 whereby the channel region 23 is capable to transport a larger amount of steam in the vicinity of the inner periphery 10*a* of the refiner segment, and also enables a laminate material- and steam flow.

The embodiments of the proposed technology that enables the channel region 23 to transport a larger amount of steam in the vicinity of the inner periphery 10*a* of the refiner segment, and also enables a laminate material- and steam flow, may also be provided with a channel region 23 that has a depth that is gradually getting larger in a direction extending from the outer periphery 10*a* of the refiner segment toward the inner periphery 10*b* of the refiner segment.

According to a particular embodiment of the proposed technology there is provided a refiner segment 10 that is provided with a number N of spaced apart bars 20*i*, where N takes value in the interval [4; 7]. This embodiment provides a refiner segment that is sparsely equipped with refining bars, the sparsely equipped refiner segment will ensure that the material to be refined is transported towards the outer edges of the refiner segment comparatively quickly while at the same time providing a robust construction. It is for example possible to provide the bars symmetrically around the refiner segment in order to obtain an even material flow, if for example the refiner segment is shaped as a half-circle spanning between 0° and 180° it will be possible to provide 6 bars on the refiner segment where each bar is offset by 30° from both of its neighbors. In general, if a refiner segment is defined as a circle sector with the angle $\Omega$, it will be possible to obtain a refiner segment with a number N of symmetrically arranged bars that are mutually offset by the angle $\Omega/N$. There should preferably be a smallest angle offset between adjacent bars that lies in the interval 5° to 15°.

Still another embodiment of the proposed technology provides a refiner segment 10 is that is provided with a plurality of spaced apart bars 20*i*, that extend in a direction from an inner periphery 10*a* of the refiner segment 10 towards an outer periphery 10*b* of the refiner segment 10 and which bars further extend around 20-40% of the total radial length of said refiner segment. That is, if the refiner segment has a radial length of R, the spaced apart bars should preferably be arranged to lie in a segment area that extend from the inner periphery 10*a* of the refiner segment to a length lying in the interval [R/5, 2R/5].

According to a particular version of the above embodiment there is provided a refiner segment 10 wherein the outer regions of the refiner segment, i.e., those regions that are not provided with spaced apart bars 20*i*, are provided with refining structures adapted for processing wood chips. This embodiment ensures that refining material comprising wood chips is forced towards the outer regions of the refiner segment through the steering action of the spaced apart bars and processed by refining structures provided on the outer regions. The refining structures may be structures that protrude from the working surface of the refiner segment in order to process, e.g, grind or tear the wood chips. The refining structures may for example be regular bars, i.e., where adjacent bars have an intermediate area with a constant depth.

Figure 6A:
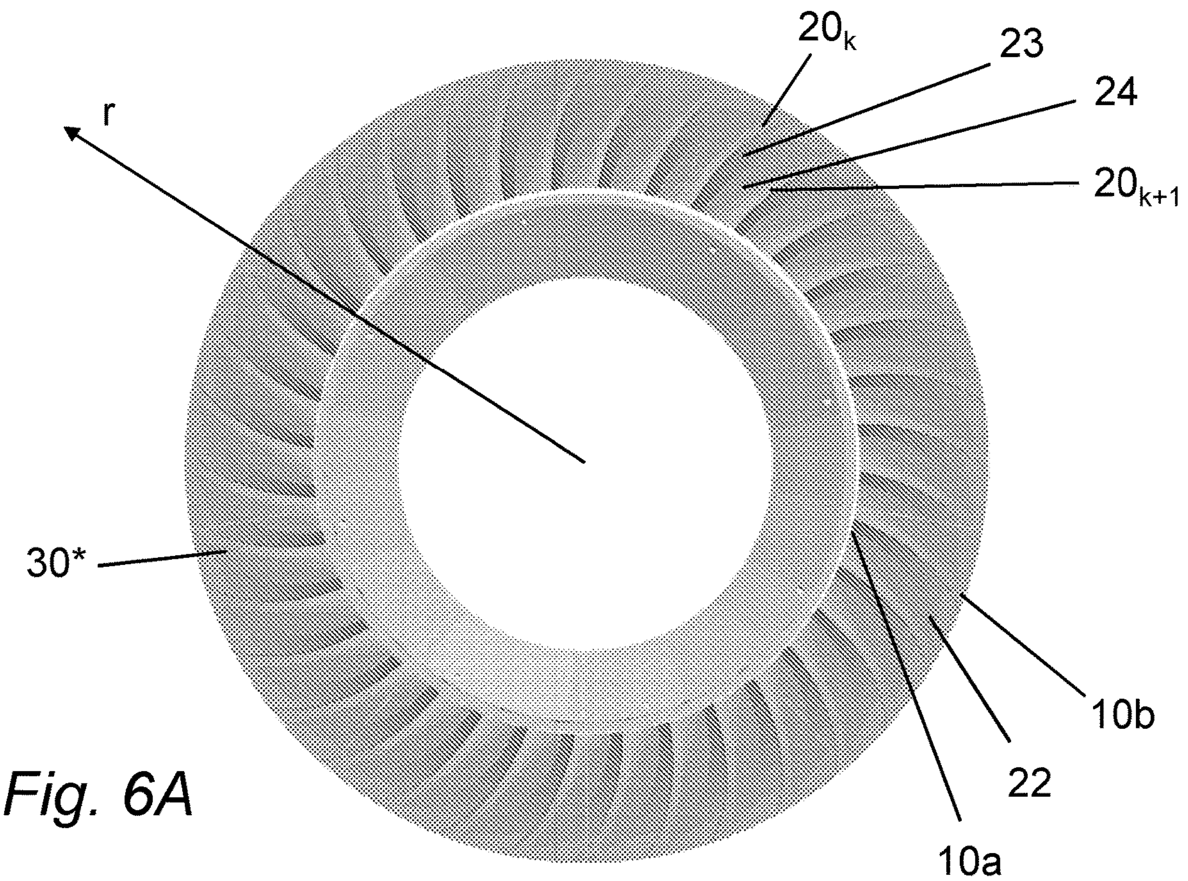
FIG. 6A is a schematic illustration of a refiner disc provided with refiner segments according to the proposed technology.
Figure 6B:
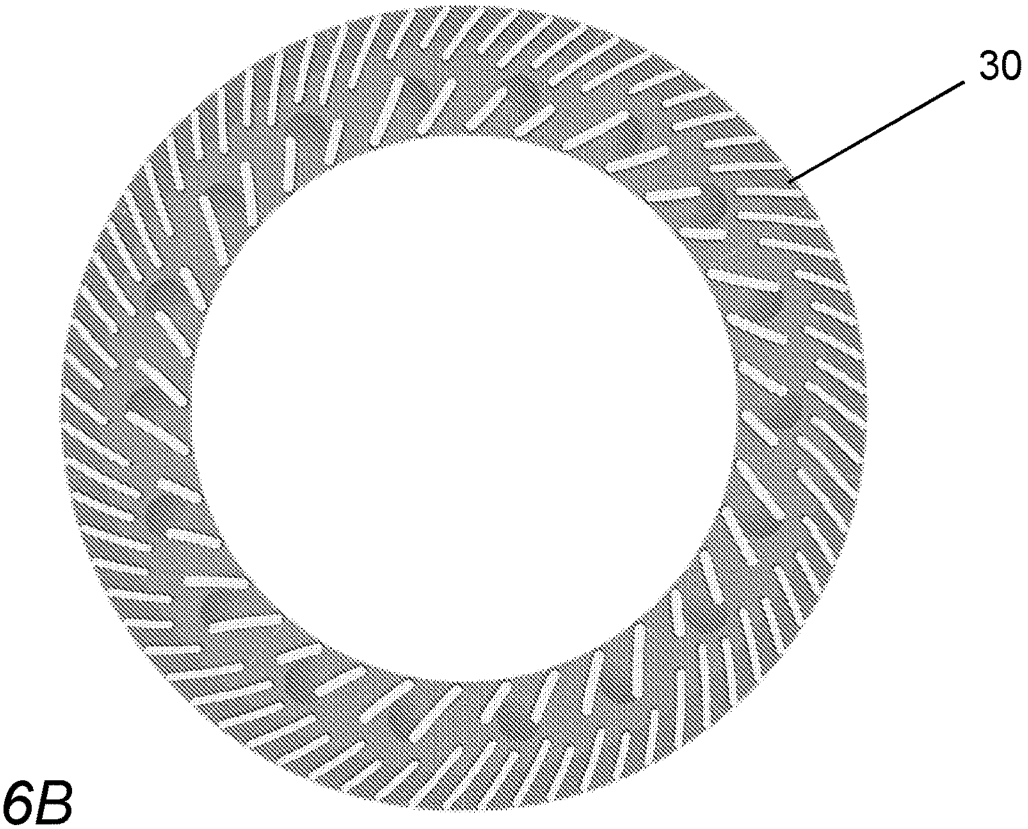
FIG. 6B is a schematic illustration of a known refiner disc that may cooperate with the refining disc in FIG. 6A.
Figure 7:
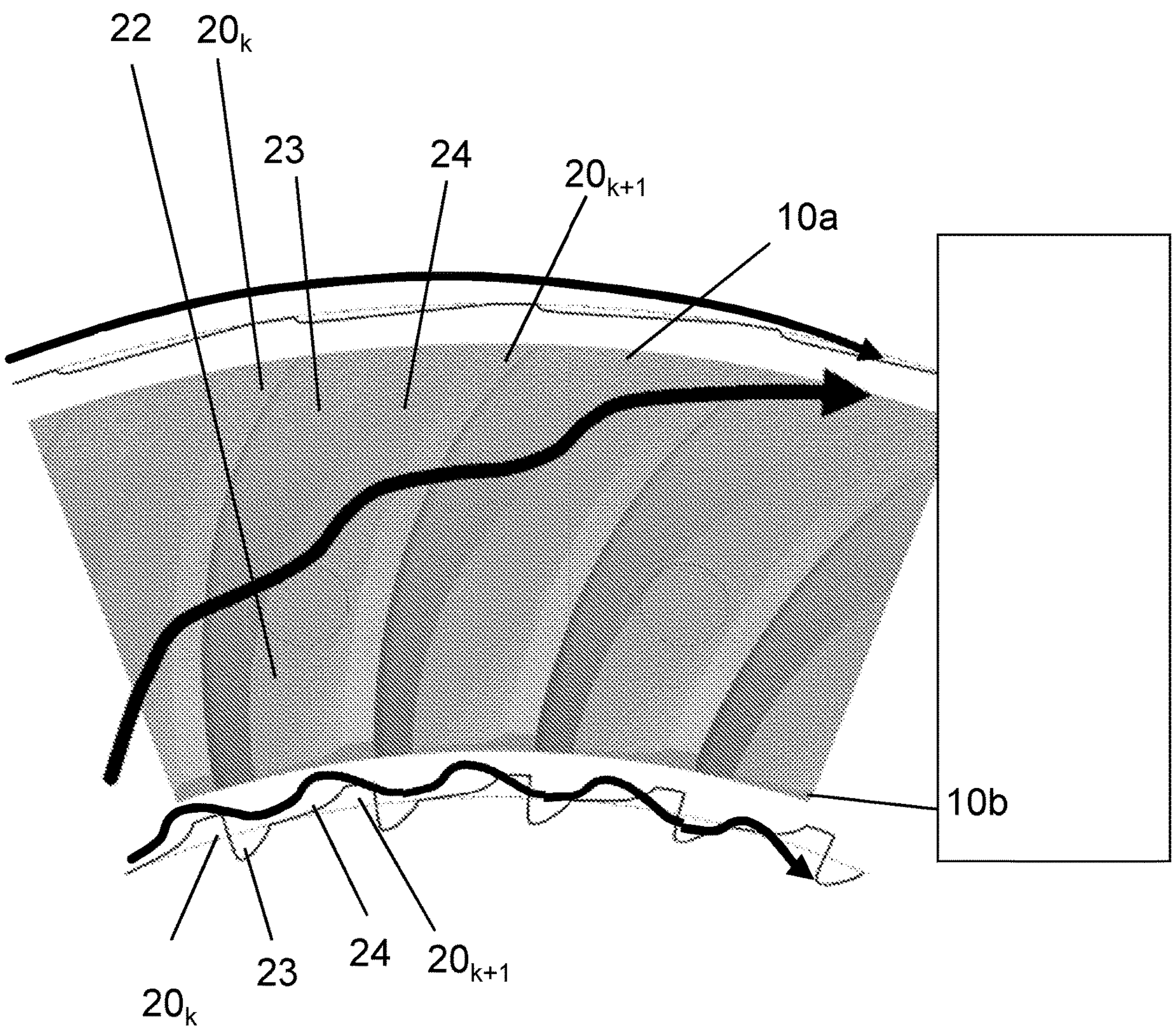
FIG. 7 is a schematic illustration of the material flow on a refiner segment according to the proposed technology.

Having described a number of embodiments of the refiner segment according to the proposed technology, in what follows we will describe the workings of such a refiner segment when provided on a refiner disc of a refiner of lignocellulosic material. The refining segment according to the proposed technology may be provided in the shape of a segment to be attached to a refiner disc 30. A refining segment may be provided in the shape of a circle, optionally with a removed central area, or in the shape of a circle sector. A refiner disc 30 may thus be provided with a number of refiner segments whereby it will either be completely covered by refining segments or partially covered. The refining disc 30 may in this particular case be referred to as a segment holder. The refining segment may however also be provided in the form of a complete integrated disc, thus forming part of, or defining, the refining disc in itself. In this case the refining segment and the refining disc 30 form an integrated structure that can be attached to a rotor or a stator. A refining segment may be provided in the shape of a circle, optionally with a removed central area, or in the shape of a circle sector. A refiner disc 30 may thus be provided with a number of refiner segments whereby it will either be completely covered by refining segments 1 or partially covered. Reference is now made to FIGS. 6A and 6B. FIG. 6A illustrates a particular example of the proposed technology where the refiner segment is provided on a stator disc 30*. The stator disc 30* is provided with a partially circular refiner segment comprising bars such as bars $\mathbf{20}_k$; $\mathbf{20}_{k+1}$ that bounds intermediate areas 22 separated into channel regions 23 and ridge or plateau regions 24. The refiner segment extends from an outer periphery of the disc, which outer periphery may coincide with the outer periphery 10*b* of the refiner segment, to an inner periphery 10*a*. The stator disc 30* may, as in the case illustrated in FIG. 6A, comprise a central refiner segment free area which may support a center plate that is adapted to distribute material that flows onto the center of the disc in a radial direction towards the outer periphery of the disc. The radial direction is denoted with an arrow designated r. During use of the refiner the stator disc 30* is arranged opposite a rotor disc 30. A possible rotor disc is illustrated in FIG. 6B. The refining discs 30 and 30* are described as a stator, i.e., a stationary refining disc, and a rotor, i.e., rotating disc, in this example. The discs may however both be rotating. It is moreover also possible to equip the rotor disc with the refining segment according to the proposed technology instead of the stator disc. It is also possible to equip both of the relatively rotating discs with the refining segments according to the proposed technology. It may however be slightly preferred to equip the stator disc with the refiner segments. The oppositely arranged refining discs 30 and 30* are separated by a small gap, referred to as the refining gap. It is in this gap where the bulk of the refining action takes place. Hence when a refiner is activated material to be refined are fed onto a center plate of the stator 30*, possibly through an inlet channel having an opening in the center of the rotor disc, the center plate directs the material outwards in a radial direction whereby the material is refined in the refining gap on its way towards the periphery. To avoid that the material get stuck in the center and that it is evenly distributed over the refining segment it is of importance that the incoming material is allowed to swiftly move in a radial fashion. One of the possible mechanism that negatively impacts the material flow is, as has been described earlier in this disclosure, the interaction between steam produced during the refining process and the material flow. By providing refining segments that provide separate paths for the steam and the material it is possible to improve the material flow and distribution over the gap. FIG. 7 provides a schematic illustration of the material flow over the refining segment according to the proposed technology. The arrow in the drawing illustrates the travelling direction of the material when the relative rotation is in the anti-clock wise direction. The material traverses the area 22 in a surfing-like fashion mainly contacting the ridge or plateau regions 24 on the way between the inner periphery 10*b* and toward the outer periphery 10*a* while any steam produced in the process is allowed to occupy the free space provided by the channel region 23. The lower part of FIG. 7 illustrate the material flow as viewed in cross-section. The arrow illustrates the surfing-like motion of the material flow.

It is clear from the example above that one aspect of the proposed technology provides a refiner disc 30 provided with a refiner segment according to what has been shown in this disclosure.

It is also clear that an additional aspect of the proposed technology provides a refiner disc 30 provided with a refiner segment according to what has been shown in this disclosure, wherein the refiner disc 30 is a stator disc or a rotor disc.

It is also clear that an additional aspect of the proposed technology provides a refiner 100 comprising a refiner disc as above.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

The invention claimed is:

1. A refiner segment configured to be attached to a refiner disc in a refiner of lignocellulosic material, the refiner segment comprising:

a plurality of bars extending in a direction from an inner periphery of the refiner segment towards an outer periphery of the refiner segment;

a plurality of intermediate areas, each intermediate area disposed between adjacent bars of the plurality of bars and configured to separate each bar from an adjacent bar, wherein at least one of the intermediate areas comprises:

a channel region having a first side and extending a first depth into the refiner segment, and a ridge region connected to the first side of the channel region and extending a second depth into the refiner segment less than the first depth, wherein:

the channel region has a width $W_1$ that gradually decreases in a direction from the outer periphery of the refiner segment toward the inner periphery of the refiner segment, and the ridge region has a width $W_2$ that correspondingly increases in the direction from the outer periphery of the refiner segment toward the inner periphery of the refiner segment.

2. The refiner segment of claim 1, wherein:

the channel region includes a second side connected to a first bar of the plurality of bars; and the ridge region includes a second side connected to a second bar of the plurality of bars adjacent to the first bar such that the second side of the channel region and the second side of the ridge region are disposed on opposite sides of the intermediate area.

3. The refiner segment of claim 2, wherein the ridge region has a height that increases in a direction extending from the first side of the channel region to the second side of the ridge region.

4. The refiner segment of claim 1, wherein the channel region comprises a channel having a block-shaped cross-section.

5. The refiner segment of claim 1, wherein the first depth of the channel region into the refiner segment increases in the direction from the outer periphery of the refiner segment to the inner periphery of the refiner segment.

6. The refiner segment of claim 1, wherein a height difference between the first depth of the channel region into the refiner segment and the second depth of the ridge region into the refiner segment gradually increases in the direction extending from the outer periphery toward the inner periphery.

7. The refiner segment of claim 1, wherein the ridge region forms a plateau region.

8. The refiner segment of claim 1, wherein the plurality of bars includes a number N of spaced apart bars, where N is between 4 and 7.

9. The refiner segment according to claim 1, wherein the plurality of bars extend around 20-40% of a total radial length of the refiner segment.

10. The refiner segment of claim 9, further comprising:

an outer region disposed between the plurality of bars and the outer periphery of the refiner segment; and a plurality of refining structures disposed in the outer region, the plurality of refining structures configured to process wood chips.

11. The refiner segment of claim 1, wherein the channel region comprises a channel having an at least partially angled cross-section.

12. A refiner segment of claim 1, wherein the channel region comprises a channel having a chamfered cross-section.

13. A refiner segment of claim 1, wherein the channel region comprises a channel having a bowl-shaped cross section.

14. A refiner disc provided with a comprising the refiner segment of claim 1.

15. The refiner disc of claim 14, wherein the refiner disc is a stator disc or a rotor disc.

16. A refiner comprising the refiner disc of claim 15.

* * * * *